(12) United States Patent
Scholz et al.

(10) Patent No.: US 6,890,400 B2
(45) Date of Patent: May 10, 2005

(54) OVERLAMINATED PRESSURE-SENSITIVE ADHESIVE CONSTRUCTION

(75) Inventors: William F. Scholz, Altadena, CA (US); Eric Chen-nan Su, Mentor, OH (US); Norman A. Conti, Painesville, OH (US); Johannes Schut, Alphen aan den Rijn (NL); David J. Scanlan, Hermosa Beach, CA (US); Steven J. Vargas, Glendale, CA (US); Ronald Ugolick, San Dimas, CA (US); Jose Luis Mendez, Baldwin Park, CA (US); Edward I. Sun, Arcadia, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/925,836

(22) Filed: Aug. 7, 2001

(65) Prior Publication Data

US 2002/0041945 A1 Apr. 11, 2002

Related U.S. Application Data

(60) Division of application No. 09/049,376, filed on Mar. 27, 1998, now Pat. No. 6,270,871, which is a continuation-in-part of application No. PCT/US97/17404, filed on Sep. 26, 1997.
(60) Provisional application No. 60/026,819, filed on Sep. 27, 1996.

(51) Int. Cl.$^7$ ............................................. B32B 33/00
(52) U.S. Cl. .............. 156/277; 156/244.11; 156/244.16; 156/244.19; 156/244.24; 156/322; 428/208.4
(58) Field of Search ....................... 156/244.11, 244.16, 156/244.19, 244.24, 277, 322, 244.23; 427/208.4

(56) References Cited

U.S. PATENT DOCUMENTS

| 2,708,650 A | 5/1955 | Pullman et al. ............. 154/140 |
| 3,027,271 A | 3/1962 | Plasse et al. .................. 117/76 |
| 3,183,198 A | 5/1965 | Wagner ........................ 260/18 |
| 3,239,478 A | 3/1966 | Harlan ......................... 260/27 |
| 3,279,970 A | 10/1966 | Foukal ....................... 156/270 |

(Continued)

FOREIGN PATENT DOCUMENTS

| AU | A-50735/90 | 6/1990 |
| EP | 0492 942 A2 | 7/1992 |

(Continued)

OTHER PUBLICATIONS

Don E. Floyd, "Polyamide Adhesives," pp. 425–433.

C.R. Frihart et al., "Relationship of Dynamic Mechanical and Thermal Properties to Tack for Hot Melt Polyamide Films," *Hot Melt*, 1990, pp. 99–109.

Thomas Flanagan, "Hot–melt Adhesives," *Handbook of Adhesive Bonding*, pp 8–1thru 8–30.

*Primary Examiner*—Nasser Ahmad
(74) *Attorney, Agent, or Firm*—Jeffer, Mangels, Butler & Marmaro LLP

(57) ABSTRACT

Overlaminated faceless PSA label constructions of this invention comprise a low material cost, thin prelaminate PSA construction having a layer of pressure-sensitive material disposed on a release surface of a removable substrate, and a nonblocking continuous film disposed over a surface of the layer of pressure-sensitive adhesive to render the pressure-sensitive adhesive tack free. An optically transparent overlaminate film layer is disposed over the nonblocking continuous film, and a printed indicia is interposed between the overlaminate film layer and nonblocking continuous film. The prelaminate PSA construction does not include a conventional facestock formed from paper, cardboard or plastic, and is highly conformable.

6 Claims, 8 Drawing Sheets

U.S. PATENT DOCUMENTS

| | | | |
|---|---|---|---|
| 3,343,978 A | 9/1967 | Engelbach | 117/76 |
| 3,471,357 A | 10/1969 | Bildusas | 161/165 |
| 3,494,818 A | 2/1970 | Marchese | 161/3 |
| 3,623,944 A | 11/1971 | Davis | 161/242 |
| 3,631,617 A | 1/1972 | Pekke | 40/2.2 |
| 3,843,480 A | 10/1974 | Dreher | 161/167 |
| 3,864,855 A | 2/1975 | Pekko et al. | 40/2 R |
| 4,022,926 A | 5/1977 | Keough et al. | 428/41 |
| 4,068,028 A | 1/1978 | Samonides | 428/40 |
| 4,121,961 A | 10/1978 | Brunette et al. | 156/249 |
| 4,135,033 A | 1/1979 | Lawton | 428/344 |
| 4,180,929 A | 1/1980 | Schultz, Jr. | 40/2.2 |
| 4,253,899 A | 3/1981 | Takemoto et al. | 156/277 |
| 4,264,657 A | 4/1981 | Tollette | 428/35 |
| 4,379,806 A | 4/1983 | Korpman | 428/354 |
| 4,391,853 A | 7/1983 | Pointon | 427/152 |
| 4,398,985 A | 8/1983 | Eagon | 156/233 |
| 4,544,590 A | 10/1985 | Egan | 428/40 |
| 4,713,273 A | 12/1987 | Freedman | 428/40 |
| 4,716,052 A | 12/1987 | Waugh et al. | 427/147 |
| 4,737,225 A | 4/1988 | Waugh et al. | 156/242 |
| 4,853,421 A | 8/1989 | Hayes | 523/223 |
| 4,886,844 A | 12/1989 | Hayes | 523/223 |
| 4,911,994 A | 3/1990 | Will et al. | 429/167 |
| 4,917,926 A | 4/1990 | Weinhold et al. | 428/40 |
| 4,946,532 A | 8/1990 | Freeman | 156/243 |
| 5,025,043 A | 6/1991 | Smith | 523/326 |
| 5,095,058 A | 3/1992 | Smith et al. | 524/238 |
| 5,109,054 A | 4/1992 | Smith | 524/514 |
| 5,151,309 A | 9/1992 | Dollinger | 428/40 |
| 5,186,782 A | 2/1993 | Freedman | 156/244 |
| 5,225,260 A * | 7/1993 | McNaul | 428/40.1 |
| 5,234,736 A | 8/1993 | Lee | 428/42 |
| 5,302,431 A | 4/1994 | Schultz | 428/35.7 |
| 5,380,572 A | 1/1995 | Kotani et al. | 428/40 |
| 5,407,985 A | 4/1995 | Smith | 524/238 |
| 5,428,083 A | 6/1995 | Smith et al. | 523/414 |
| 5,451,283 A | 9/1995 | Josephy et al. | 156/229 |
| 5,516,393 A | 5/1996 | Freedman | 156/229 |
| 5,539,025 A | 7/1996 | Smith et al. | 523/418 |
| 5,605,944 A | 2/1997 | Heebner | 523/404 |
| 5,676,785 A * | 10/1997 | Samonides | 156/244.11 |
| 5,700,571 A | 12/1997 | Logue et al. | 428/352 |
| 5,712,031 A | 1/1998 | Kelch et al. | 428/355 |

FOREIGN PATENT DOCUMENTS

| | | |
|---|---|---|
| GB | 1058074 | 8/1964 |
| GB | 2 299 295 | 10/1996 |
| WO | WO 92/01555 | 2/1992 |
| WO | WO 92/08429 | 5/1992 |
| WO | WO 93/11728 | 6/1993 |
| WO | WO 9608539 | 3/1996 |
| WO | WO 97/12006 | 4/1997 |

* cited by examiner

OVERLAMINATED PRESSURE-SENSITIVE ADHESIVE CONSTRUCTION

RELATION TO COPENDING PATENT APPLICATIONS

This patent application is a divisional application of U.S. patent application Ser. No. 09/049,376, filed on Mar. 27, 1998 now U.S. Pat. No. 6,270,871, which is a continuation-in-part patent application of International Patent Application No. PCT/US97/17404 that was filed on Sep. 26, 1997, which claimed priority of U.S. Provisional Patent Application No. 60/026,819 that was filed on Sep. 27, 1996.

FIELD OF THE INVENTION

The present invention relates to pressure-sensitive adhesive constructions used for making tags, labels and the like and, more particularly, to highly-conformable, cost efficient pressure-sensitive adhesive constructions comprising a prelaminate construction having a thin nonblocking printable continuous film disposed onto a layer of a pressure-sensitive adhesive, which is overlaminated to enable high-speed converting and dispensing using conventional peel plate equipment.

BACKGROUND OF THE INVENTION

Pressure-sensitive adhesive (PSA) constructions such as labels, tapes, decals and the like are known in the art. For example, PSA label constructions are commonly used to apply a particular facestock having a specific nature of printing to an object or article, and are especially useful where objects having low surface energies are to be labeled. PSA label constructions typically comprise a liner, a PSA layer disposed onto the liner, and a facestock laminated onto the PSA layer. The facestock is typically made from a web or sheet of paper, cardboard or plastic and is applied or laminated to the PSA layer sequentially at some time after the application of the PSA layer. The facestock is printed on with information or other indicia before or after it is laminated onto the PSA layer. Such conventional PSA label construction is applied to an object surface or other substrate surface by removing the liner to expose the PSA layer and placing the PSA layer into contact with the desired surface.

In the manufacture and production of PSA constructions, a substantial amount of the overall cost involved is attributed to the material costs for the different material layers, e.g., the PSA and the facestock, be it paper, cardboard, or plastic. The layer thickness and layer materials for such conventional PSA constructions have been selected to provide desired properties of convertibility, e.g., by conventional converting techniques such as by die-cutting and matrix-stripping, dispensibility, e.g, by conventional dispensing equipment such as by peel plate, and conformability, e.g., enabling the applied label to adhere to an irregular or deformable substrate surface without becoming detached or damaged.

It is known that the stiffness of a PSA construction will have an impact on its convertibility and dispensibility. As a rule of thumb, as the construction stiffness is increased so is convertibility and dispensibility of the construction. However, the conformability of a PSA construction is known to decrease as the construction stiffness is increased. Thus, the objective stiffness for a PSA construction is a compromise between convertibility/dispensibility and conformability. This compromise does not present a problem when designing a PSA construction for an application that does not require a high degree of conformity, such as a permanently flat surface. In such applications, the layer thickness and material choice is simply tailored to meet the desired convertibility/dispensibility and application criteria. This compromise does, however, present a problem when the construction application calls for conformability.

Prior art conformable PSA constructions having a Gurley stiffness of at least 10 mg, and more commonly of at least 20 mg or greater are known and are described in U.S. Pat. Nos. 5,186,782; 5,516,393; 4,713,273; and 5,451,283. Those patents exploited the idea that a proper differential between machine direction stiffness and cross dimension stiffness, with the latter being the lower of the two, could enable a heat-set film to be dispensed at high speeds, yet be suitable for flexible-film applications. Such label film might exhibit acceptable overall conformability to flexible substrates even though the film has less inherent conformability than polyvinyl chloride (PVC). The present invention provides a further breakthrough in the balance between dispensability and conformability, and achieves relatively low stiffness, yet conventionally dispensable labels which are well suited to applications calling for a high degree of conformability.

Specific applications calling for highly-conformable PSA constructions include those where the label is to be adhered to a small-diameter contoured surface or irregular surface. In such an application, unnecessary construction stiffness or rigidity could interfere with label's ability to conform and remain adhered to the underlying substrate surface. Additionally, these conventional PSA constructions are not manufactured in a most economically efficient manner.

Additionally, conventional PSA label constructions are not well suited for specific uses such as label applications where the label and underlying substrate are subjected to particular process conditions. For example, conventional PSA label constructions comprising a paper facestock and/or lacking necessary properties of conformability are known to be adversely affected when used on glass beverage bottles, during the washing/rinsing, filling and pasteurization process, due not only the decomposition of the paper facestock itself but to the failure of the PSA to remain adhered to the substrate surface. It is believed that such label lifting can be attributed to the rigidity or stiffness of such conventional PSA labels that, once the PSA is heated, causes the label and PSA to peel away and lift from the substrate surface. In such bottle label application, to avoid damage to the paper label, the paper labels are applied to a bottle after it has been rinsed, filled, and pasteurized, i.e., the label is "post applied". Generally, printed paper labels are post applied to filled bottles using aqueous adhesives or hot melt adhesives.

If post-applied paper labels are not completely adhered to the bottle, are misaligned on the bottle, or are otherwise incorrectly applied to the filled bottle, then the entire bottle and contents will be unusable and must be discarded. Thus, it is desired that glass bottles be labeled and inspected prior to being filled and pasteurized to eliminate defective bottles or labels.

It is known in the art to use certain high-performance acrylic PSAs to pre-apply plastic labels to glass bottles following bottle formation at a bottle manufacturing plant. Examples include Optiflex labels available from Flexcon, and Primeline label films available from Polykote Corporation. While these labels can generally withstand the bottle washing/rinsing, filling, and pasteurization operations at a bottle filling plant, they make use of specialized adhesives, such as solvent or emulsion acrylics, that are economically undesirable from a manufacturing perspective, making them an unattractive option when compared to conventional gum-type labels.

It is, therefore, desired to provide a PSA construction for use as a label, tag, tape, decal and the like in a manner that avoids the need to use a conventional facestock formed from paper, cardboard or plastic. It is desired that the printed message or indicia of such construction be protected from damage that can be caused by contact with adjacent physical objects or by exposure to moisture, weather and the like. It is desired that the PSA label construction be convertible by die-cutting and matrix-stripping methods at high speeds, be dispensable by conventional peel plate equipment, and be highly conformable. It is further desired that such PSA construction be capable of withstanding rinsing, filling, and pasteurization operations when applied to a glass beverage bottle to permit its use as a pre-applied label. It is also desired that the PSA label construction be manufactured in an economically efficient manner when compared to conventional PSA constructions

SUMMARY OF THE INVENTION

Overlaminated PSA label constructions of this invention comprise a prelaminate PSA construction having a layer of pressure-sensitive material disposed on a release surface of a removable substrate, and a nonblocking non-paper continuous film disposed over a surface of the layer of pressure-sensitive adhesive to render it tack free; said prelaminate PSA construction being provided with an overlaminate film layer disposed over the nonblocking continuous film, and a printed indicia interposed between the nonblocking continuous film and overlaminate film layer. The prelaminate PSA construction is a highly conformable, low material cost, thin construction, having a thickness (excluding the removable substrate) in the range of from about 6 to 250 micrometers ($\mu$m), more preferably in the range of from about 20 to 75 $\mu$m, and having a Gurley stiffness of less than about 25 mg. For applications calling for a high degree of conformability, the prelaminate PSA construction can be designed having Gurley stiffness of less than about 10 mg, and preferably less than about 5 mg.

The continuous and overlaminate film layers are each selected from the group of films and film-forming polymers consisting of polyolefins such as polypropylene, polyethylene, polyvinylchloride, polyamide resins, polyester resins, polyurethane resins, varnishes, polyacrylate resins, vinyl acetate resins, vinyl acetates such as ethylene vinyl acetate (EVA), ethylene methacrylic acid (EMAA), copolymers and mixtures thereof. In the PSA construction of the preferred embodiment, which is dispensable by conventional means, the continuous film layer comprises a thin, highly conformable, printable material, and the overlaminating film layer has a higher stiffness than the continuous film layer.

The continuous film can be applied sequentially or simultaneously with the pressure-sensitive adhesive. For purposes of simultaneous application, it is desired that the continuous film be formed from a material having a hot melt viscosity at a given temperature that is compatible with the viscosity of a hot melt PSA. For example, in a dual die, hot melt coating with a conventional hot melt adhesive, the hot melt viscosity of the continuous film layer is preferably within a factor of about 8 times that of the hot melt viscosity of the PSA at a high shear rate.

The overlaminated film layer can be laminated to the prelaminate PSA construction by pressure, when in the form of a continuous film having a layer of adhesive material interposed between the continuous film and overlaminated film layers. The overlaminated film layer can be laminated to the prelaminate faceless PSA construction by heat and pressure, when either the continuous film or the overlaminate film is formed from a material that when heat activated forms its own adhesive surface for lamination. Alternatively, the overlaminated film layer can be applied by extrusion or coating technique to the prelaminate PSA construction as a film-forming material that subsequently cures to form a continuous film. The label construction printing indicia can be disposed on nonblocking continuous film surface and/or on a backside surface of the overlaminate film layer.

Overlaminated PSA constructions of this invention retain the high degree of conformity, provided by the low cost prelaminate PSA construction, while building sufficient stiffness into the construction without the use of a convention paper, cardboard or plastic facestock to promote high-speed convertibility by die-cutting and matrix-stripping methods, and dispensing by peel plate equipment. Overlaminate PSA constructions of this invention have a Gurley stiffness of less than about 40 mg. For applications calling for a high degree of conformability, the overlaminated PSA construction can be designed having Gurley stiffness of less than about 20 mg, and preferably less than 10 mg, and in some instances in the range of from about 3 to 8 mg.

Overlaminated PSA constructions of this invention provide a transparent coating or film over the printed indicia to protect it from damage caused by physical contact with adjacent objects, and damage caused by exposure to moisture, water or weather. The transparent coating or film enhances the optical qualities of the underlying printed indicia to provide a glossier and richer image. PSA constructions of this invention are uniquely suited for use as labels on substrates subjected to subsequent liquid processing, e.g., bottle washing/rinsing, filling and pasteurization, or liquid immersion, e.g., ice bath, without displaying adverse consequences such as label lifting or hazing.

BRIEF DESCRIPTION OF THE DRAWINGS

These and other features and advantages of the present invention will become appreciated as the same becomes better understood with reference to the specification, claims and drawings wherein:

DETAILED DESCRIPTION OF THE INVENTION

The present invention is directed to thin, printable, convertible, dispensable and conformable PSA constructions which do not have a conventional facestock formed from paper, cardboard, or plastic laminated to a PSA layer. PSA constructions of this invention generally comprise a first flexible substrate, a layer of releasable material disposed on a surface of the flexible substrate, a PSA disposed on the layer of releasable material, a thin continuous film disposed onto a surface of the PSA layer that renders the PSA layer surface tack free, an overlaminate film layer laminated to the thin continuous film layer, and printing indicia interposed between the continuous film layer and overlaminated film layer.

PSA constructions of this invention make use of a thin, low cost, printable prelaminate construction that is subsequently overlaminated to produce an overlaminated PSA construction that is convertible at high speeds, that is dispensable using conventional peel plate dispensing equipment, and that has a high-degree of conformability making it uniquely suited for PSA label applications previously not thought possible. For example, PSA constructions of this invention can be pre-applied to glass bottles, prior to washing/rinsing, filling and pasteurization processes, without adverse consequences. The design of the overlaminated PSA construction, avoiding the need to use a conventional facestock, reduces the material costs associated with using conventional facestock materials, reduces manufacturing time associated with forming the printed label, and provides a label having a protective surface to minimize or eliminate damage to the printed surface caused by physical contact or exposure to moisture, weather and the like.

Figure 1:
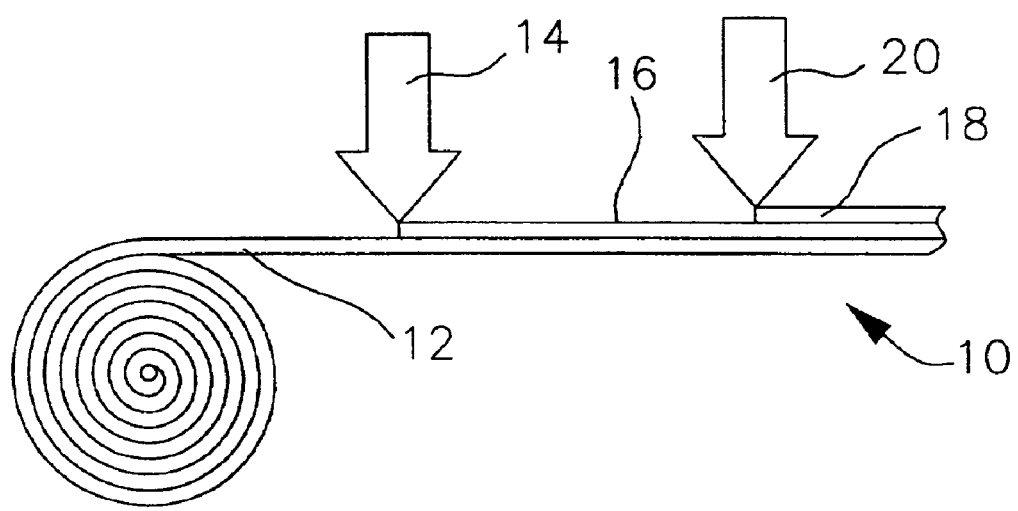
FIG. 1 is semi-schematic side elevation of a method of manufacturing a conventional prelaminate PSA label construction.
Figures 2, 3:
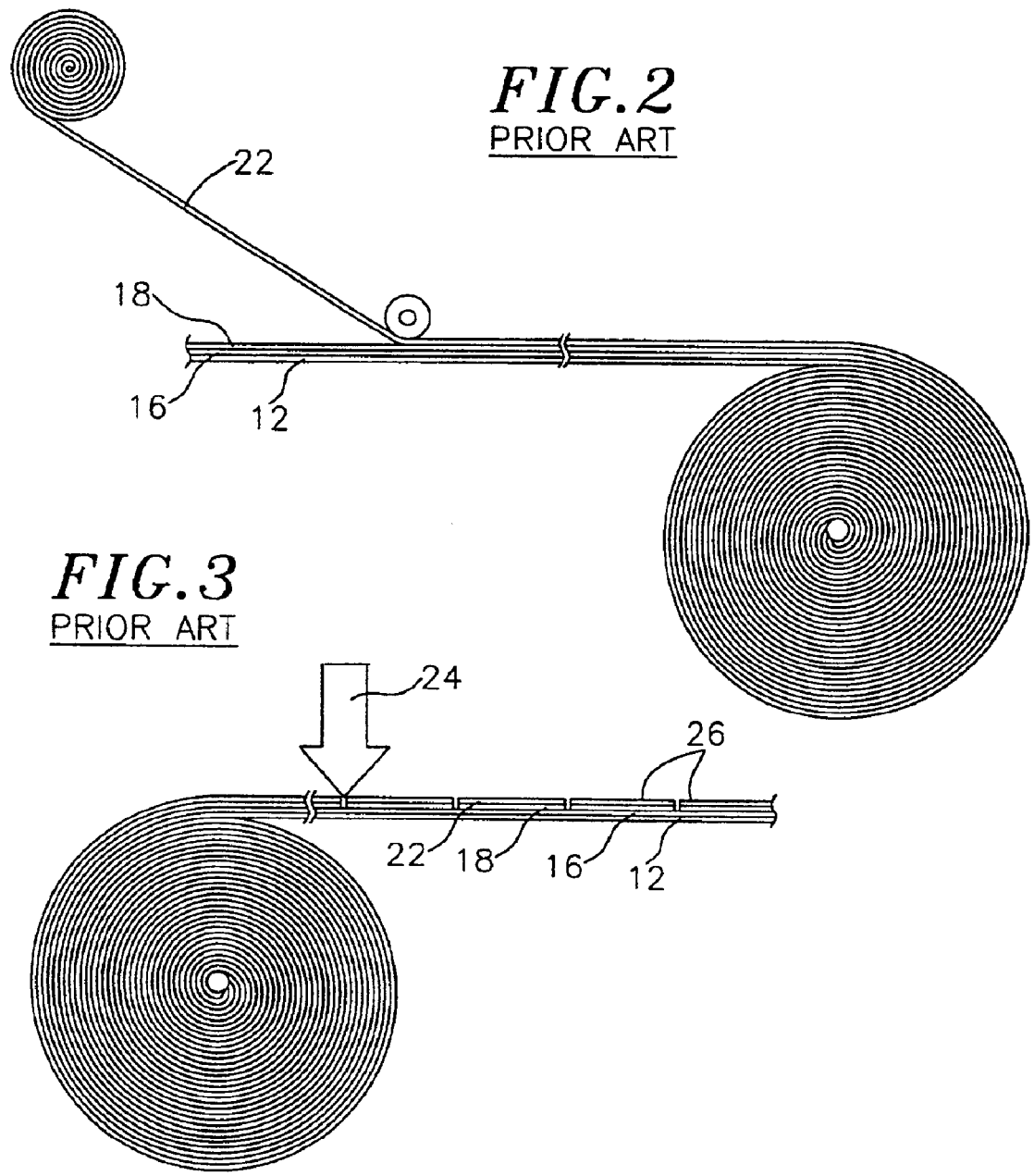
FIG. 2 is a semi-schematic side elevation of a method of applying a conventional facestock to the PSA label construction of FIG. 1 to form a laminated PSA label construction.
FIG. 3 is a semi-schematic side elevation of a method of converting the laminated PSA label construction of FIG. 2.

FIG. 1 illustrates a conventional prelaminate PSA label construction 10 comprising a liner 12 having disposed thereon at station 14 a layer of releasable material 16, forming a release liner. Alternatively, a preformed release liner comprising a liner with releasible surface can be used. A PSA layer 18 is disposed on the layer of releasable material 16 at station 20. Referring to FIG. 2, a conventional facestock 22, in sheet stock or roll stock form made from paper, cardboard, plastic and the like, is disposed on a surface of the PSA layer 18 to form a completed conventional PSA label construction. Typically, the release liner and PSA layer 18 are manufactured and laminated together with the facestock 22 during a single process, e.g., by a roll coating and lamination process or by a die coating and lamination process. As illustrated in FIG. 2, the facestock 22 is laminated to the PSA layer 18 sequentially, after the PSA layer is applied.

Such a conventional PSA label construction is printed, optionally overlaminated, cut and stripped, e.g., by conventional die-cutting and matrix-stripping methods, to form the desired shape and size label. Thus, for example, FIG. 3 illustrates the die-cutting of the facestock 22 at a station 24 into a series of PSA labels 26 of desired shape and size, carried by the release liner 16.

For purposes of reducing material costs and manufacturing time, and increasing PSA construction application flexibility, PSA constructions of this invention are constructed without using a conventional facestock, yet are convertible at high speeds and dispensable by conventional peel plate equipment. Instead, overlaminated PSA constructions of this invention make use of a thin, highly conformable "faceless" prelaminate PSA construction.

Figure 4:
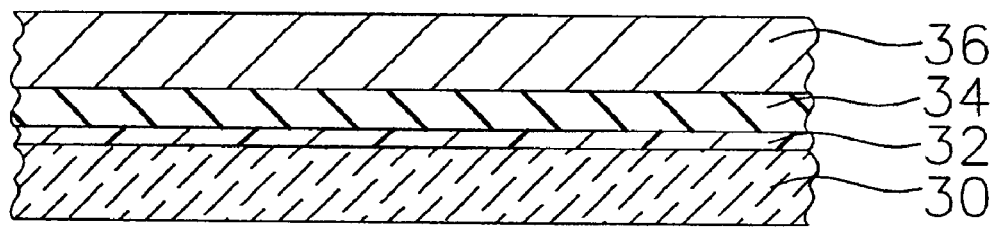
FIG. 4 is a cross-sectional side view of a prelaminate PSA label construction prepared according to principles of the invention.

FIG. 4 illustrates an example faceless prelaminate PSA construction 28 useful for forming overlaminated PSA constructions of this invention. It is to be understood that the relative thicknesses of each of the material layers illustrated in FIG. 4, and in all of the drawing figures, are not intended to be to scale and are only provided for purposes of reference and clarity. Overlaminate PSA construction comprises a substrate 30 and a layer of releasable material 32 disposed on a surface of the substrate 30. It is to be understood that the substrate 30 may be in the form of any material suitable to act as a carrier for the construction. Preferred substrates include flexible materials in the form of sheet stock or roll/web stock. A particularly preferred substrate is a web stock in the form of a liner having a release material disposed thereon, thereby forming a release liner. A particularly preferred release liner is one that is commercially available from, for example, Rhinelander Paper of Rhinelander, Wis. under the product name Rhi-Liner 12, that has a thickness of about 65 $\mu$m and has a 42 pound per ream basis weight.

Suitable releasable materials 32 include those materials with a low surface free energy that have a low affinity for the PSA, thereby allowing the PSA to be peeled away without cohesive failure. Preferred releasable materials are selected from the group of silicone-containing materials. A particularly preferred silicone-containing material for forming the layer of releasable material is commercially available from, for example, General Electric Silicones of Waterford, N.Y. under the product name GE 6000.

A layer of PSA 34 is disposed on a layer of the releasable material 32, and a layer of a film forming material (FFM) 36 is disposed on a surface of the PSA layer 34. The PSA layer 34 has a body portion and has a surface portion that is oriented immediately adjacent the layer of FFM 36. The FFM layer 36 renders the underlying PSA layer 34 tack free, thereby forming a nonblocking faceless prelaminate PSA construction that enables subsequent handling or treatment of the prelaminate construction without it adhering to itself or to any other adjacent surface. The tack-free surface is designed to accommodate printing indicia directly thereon.

The FFM layer 36 is in the form of a continuous film that completely covers the underlying PSA layer, and renders the faceless prelaminate PSA construction completely nonblocking up to a minimum temperature of at least 50° C., and in some instances up to about 70° C., for a 24 hour period under a pressure of about 40 kPa. It is desired that prelaminate PSA constructions of this invention display such nonblocking characteristics so that if collected before further processing, by roll or stack method, they can be easily removed or separated from contiguous layers without causing the release liner to be pulled free of the PSA layer. The use of the releasable material on the release liner allows the release liner to be easily removable from the PSA layer to facilitate attachment of the overlaminated PSA construction to a desired article. Adhesive interference or blocking between the FFM and an adjacent backside surface of the release liner, when the prelaminate PSA is collected before further processing, is not desired because it results in the release liner being pulled away from the PSA layer during the removal or separation operation, thereby rendering the prelaminate PSA construction useless.

It is desired that the FFM layer be formed from a material that is capable of being used with a variety of conventional PSAs, including silicone-based PSAs, rubber-based PSAs, and acrylic-based PSAs, without interfering with the desired performance characteristics of the PSA. PSAs useful in forming PSA constructions of this invention include those that are conventionally used in forming PSA constructions, such as rubber-based, silicone-based, and acrylic-based PSAs. Preferred adhesives systems are described in detail in U.S. patent application Ser. No. 07/755,585 filed Sep. 3, 1991, abandoned on Sep. 25, 1992, and incorporated herein by reference.

PSAs useful in forming PSA constructions according to principles of this invention can include, but are not limited to:

Commonly available rubber-based PSAs that are suited to hot melt application, such as those disclosed in U.S. Pat. No. 3,329,478, that is incorporated herein by reference. A commercial example of such hot melt adhesives is H2187-01 hot melt PSA sold by Ato Findley, Inc., of Wauwatusa, Wis.

Emulsion and solvent acrylic-based PSAs such as those disclosed in U.S. Pat. Nos. 5,639,811 and 5,164,444, respectively, that are incorporated herein by reference.

The layer of PSA material can be applied to the substrate for example in the form of a hot melt, an emulsion or aqueous dispersion, as a solvent solution, or as a film membrane. The method that is used to apply the PSA material depends on the physical form of the PSA, and can include spray, roll, extrusion, and die application methods. In preferred embodiments, the PSA material is applied in the form of a hot melt, solution, or emulsion by extrusion or die application methods. As will be discussed below, co-extrusion or multi-die application methods can be used to simultaneously apply the PSA material along with the FFM.

The type of FFM that is selected may vary depending on the type of material that is used to form the PSA layer. For example, it may be desired that the FFM have a solubility parameter that is inconsistent or incompatible with that of the PSA to prevent migration between the two layers when applied simultaneously. Different methods can be used to apply the FFM to the surface of the PSA layer, depending on the type of FFM that is selected. Generally speaking, the methods described above for applying different forms of the PSA material can also be used to apply the same forms of the FFM. For example, FFMs in the form of aqueous dispersions can be applied by conventional coating methods such as roll coating, spray coating, extrusion coating, die coating and the like, or by Meyer rod process; FFMs in the form of a solution or emulsion can be applied by extrusion, die, spray, or roll process; and FFMs in the form of a hot melt can be applied by roll, spray, extrusion, or die process.

If desired, the application methodology used for the FFM can be independent of both the FFM chemistry and the particular method employed to apply the PSA layer. However, for purposes of manufacturing efficiency, it is generally desirable to use a FFM that is in the same form as the PSA material so that the same application methodology can be used for each. For example, when the PSA is in the form of a hot melt or a solution that is applied by die process, it may be desired that the FFM also be in the form of a hot melt or solution to facilitate its application by a die process, e.g., by multi-die process.

As discussed above, suitable techniques for applying the FFM onto the surface of the PSA layer include roll, spray, Meyer rod, electrostatic, and die coating, depending on the particular form of the FFM as mentioned above. The application techniques generally fall into the category of either being a multi-step or sequential coating process, i.e., application of first the PSA layer and then the FFM, or a single-step or simultaneous process, e.g., application of the PSA and PPM together. In the multi-step process, the FFM can be applied to the surface of the PSA layer, after the PSA has been applied to the layer of releasable material on the release liner, in the form of a hot melt, aqueous dispersion, or solution by roll, spray, electrostatic, die or extrusion process. In the single-step process, die technology is preferably used to apply the FFM onto the PSA layer simultaneously with applying the PSA layer onto the layer of releasable material, in the form of a solution, emulsion or hot melt.

Prelaminate faceless PSA constructions of this invention are prepared according to the principles disclosed in PCT International Patent Application No. PCT/US97/17404, that is incorporated herein by reference.

Figure 5:
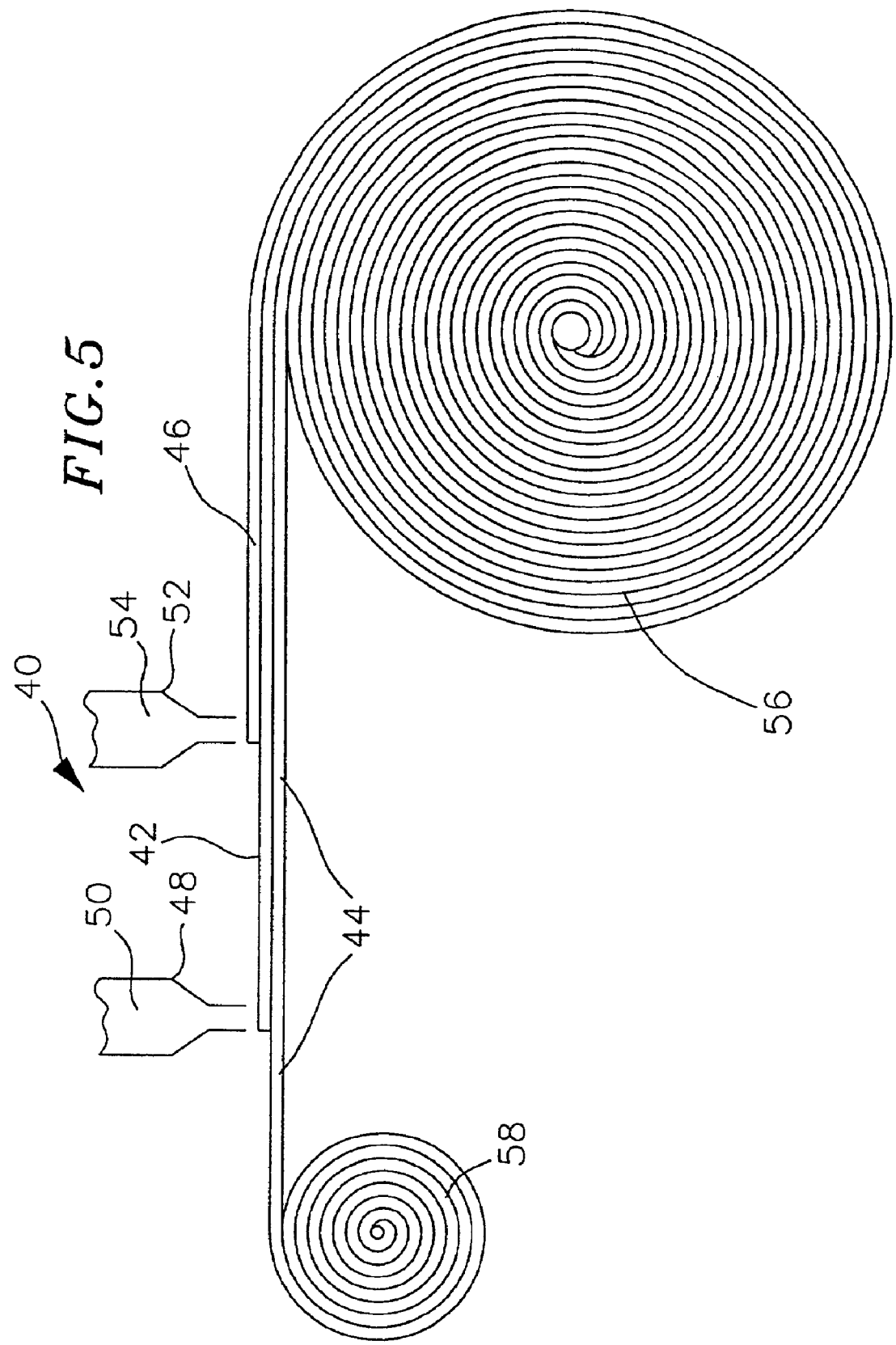
FIG. 5 is a semi-schematic side elevation of a first method making the prelaminate PSA label construction of FIG. 4.

FIG. 5 illustrates a first method of applying the PSA layer and FFM layer onto a substrate in the form of a web stock by a multi-step die or tandem die process 40, where the PSA layer 42 is applied to a release liner 44 in the form of a solution, emulsion or a hot melt, and the FFM layer 46 is subsequently applied to the PSA layer 42 as a solution, emulsion or a hot melt. This first method is illustrative of one that can easily be implemented using existing PSA coating equipment to permit subsequent application of the FFM. The PSA layer 42 is applied to the layer of releasable material on the release liner 44 by a PSA coating station 48, which contains a volume of PSA material 50. A FFM coating station 52 is disposed downstream from the PSA coating station 48 and comprises a volume of FFM 54 for depositing onto the PSA layer 42.

In the event that the PSA layer and FFM layer are each applied in the form of a hot melt, it may be desirable that a cooling platen (not shown) or the like be placed between the PSA coating station 48 and the FFM coating station 52, to cool the PSA layer 42 to prevent migration of the FFM therein. It may also be desirable to place a cooling platen (not shown) or the like after the FFM coating station 52 to cool the FFM 46 to ensure that it is tack free before the faceless PSA construction is wound on a collection roll 56.

In the event that both the PSA layer and FFM layer are applied in the form of a solution or emulsion, it may be desirable to place an evaporator (not shown) or the like between the PSA coating station 48 and the FFM coating station 52, to drive the volatile species out of the PSA layer to prevent bubble formation after application of the FFM layer. It may also be desirable to place an evaporator (not shown) or the like after the FFM coating station 52 to evaporate the volatile species out of the FFM layer 46 before the faceless PSA construction is wound on the collection roll 56.

As a continuous roll of the release liner 44 is unwound or dispersed from a pay out roll 58, the PSA coating station 48 deposits a predetermined thickness of PSA material 50 onto the layer of releasable material on the release liner 44, forming a PSA layer 42 thereon. The FFM coating station 52 deposits a predetermined thickness of the FFM 54 onto the surface of the PSA layer 42, as the faceless PSA construction travels in a continuous web through the FFM coating station 52, forming a FFM layer 46 thereon.

In an example embodiment, the PSA layer 42 has a coat weight in the range of from about 1 to 125 grams/square meter (g/m$^2$), or has a thickness in the range of from about 1 to 125 μm assuming a PSA density of about one, where a preferred PSA layer coat weight is in the range of from about 10 to 25 g/m$^2$ or 10 to 20 μm. An advantage of using a relatively thin PSA layer is that it avoids the PSA material from oozing away from the label, e.g., from the edge of the label in certain applications. It is desired that the FFM layer 46 have a thickness in the range of from about 5 to 125 μm, where a preferred FFM layer thickness is in the range of from about 10 to 50 μm.

It is to be understood that the coat weight and layer thickness of both the PSA and FFM may vary depending on different types of PSA materials and FFMs that are selected, the method that is used for applying the same, and the particular faceless PSA construction application. A prelaminate PSA construction comprising a FFM layer within the described thickness provides a thin, highly-conformable construction that is nonblocking to prevent adhesion between the PSA layer and an adjacent backside surface of a release liner to permit storing and/or transporting the prelaminate construction for further processing, e.g., printing, overlaminating, converting, dispensing and the like.

In addition to providing a nonblocking surface to the PSA layer, the FFM layer also contributes to the structural properties of the overlaminated PSA construction without the use of a conventional facestock. For example, prelaminate PSA constructions used with this PSA construction are highly conformable, and yet have a sufficient Gurley stiffness to permit high speed conversion. Example prelaminate PSA constructions have a Gurley stiffness in the machine direction of less than about 25 mg. For applications calling for a high degree of conformability, the overlaminated PSA construction can be designed having Gurley stiffness of less than about 10 mg, and preferably less than 5 mg. It is a surprising and unexpected result that such prelaminate PSA constructions, having a Gurley stiffness of less than 10 mg, are capable of being converted by die-cutting and matrix-stripping methods at high speeds, e.g., at web speeds of about 0.75 m/s (150 feet per minute), and in some cases up to about 1.5 m/s (300 feet per minute). It is also surprising that the prelaminate PSA constructions are capable of being dispensed by non-conventional dispensing equipment, such as by Ventura dispenser as described in U.S. Pat. Nos. 4,217,164 and 4,303,461, that are incorporated herein by reference.

If desired, the coat weight and/or thickness of either the FFM or PSA layer can be metered by use of a Meyer rod that can be placed after each respective coating station. To ensure accurate monitoring of the thickness of the FFM, ultraviolet (UV) chromophores can be added to the FFM to allow visual observation of coating quality during the application process, and to allow monitoring of the coat weight by on-line use of a combination ultraviolet and radio frequency gauge. A particularly preferred UV chromophore is Leucopure EGM, available from Clariant Corporation (Charlotte, N.C.).

After the prelaminate PSA construction has passed the FFM coating station 52 and the FFM 54 has been applied, the prelaminate PSA construction can be routed to and be collected on a collection roll 56 for storage and/or transporting before further processing. When a desired quantity of the prelaminate PSA construction has been manufactured and collected, the collection roll 56 is removed from the process and is stored for subsequent processing, e.g., printing, overlaminating, and/or converting during a separate operation at either the same or at a different geographic location, thereby providing enhanced manufacturing flexibility. Alternatively, rather than being collected, the prelaminate faceless PSA construction can be routed for subsequent operations such as printing or other marking process, lamination with the overlaminate film, and conversion during the same manufacturing operation.

Figure 6:
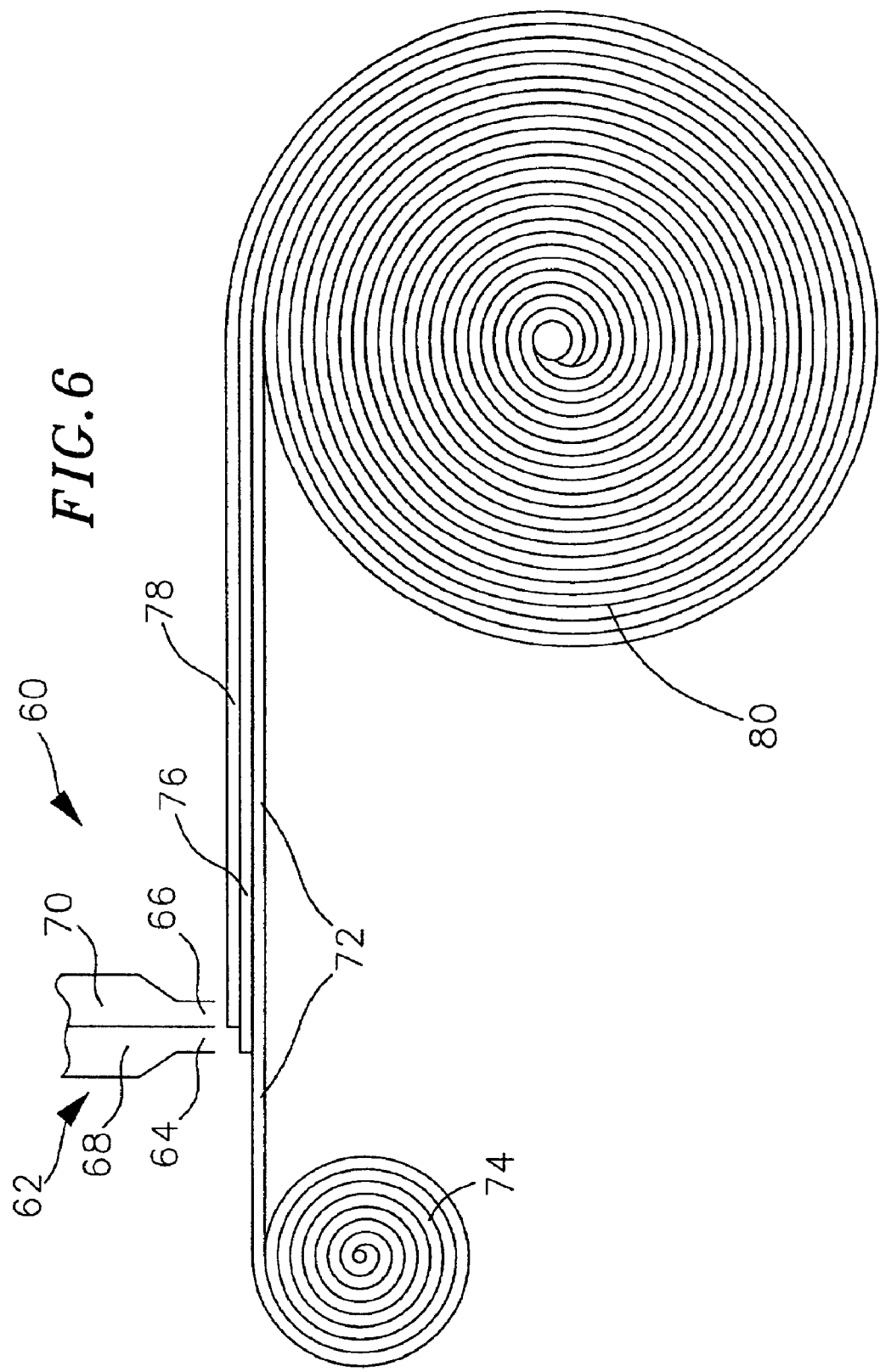
FIG. 6 is a semi-schematic side elevation of a second method of making the prelaminate PSA label construction of FIG. 4.

A second method of applying the PSA layer and FFM by a single-step multi-die process 60 is illustrated in FIG. 6. A dual die station 62, comprising a PSA die chamber 64 and a FFM die chamber 66, comprises a quantity of PSA 68 and FFM 70 in respective separated compartments. The dual die station 62 is used to deposit both the PSA and the FFM, in the form of either a hot melt, solution or emulsion, simultaneously in a single step operation.

Although FIG. 6 illustrates a single-step, multi-die process comprising a dual die station for applying the PSA layer and FFM layer, it is to be understood that the multi-die process may comprise a die station having more than two die compartments, depending on the number of layers to be deposited onto the release liner. Multi-die application methods useful for applying both the PSA layer and the FFM layer are further described in Published PCT International Application Nos. PCT/US95/11807; PCT/US95/11733; PCT/US95/11734; and PCT/US95/11717, which are herein incorporated by reference.

As a continuous roll of the release liner 72 is unwound from a pay-out roll 74, the PSA die chamber 64 deposits a desired thickness of the PSA material 68 onto the layer of releasable material on the release liner 72, forming a PSA layer 76 thereon. At the same time that the PSA material is being deposited, a desired thickness of the FFM 70 is deposited by the FFM die chamber 66 onto the just-formed surface of the PSA layer 76, forming a FFM layer 78 thereon. The finished, prelaminate faceless PSA construction is either routed for subsequent printing, overlamination, and/or conversion, or is collected on a collection roll 80.

As discussed above, subsequent printing, overlaminating, and conversion of the prelaminate faceless PSA construction may occur at the same geographical location where the prelaminate faceless PSA construction is manufactured, or may occur at a different geographical location, thereby providing an enhanced degree of manufacturing flexibility.

In the event that the PSA layer and FFM layer are applied as a hot melt, a cooling platen (not shown) or the like can be placed between the dual die station 62 and the collection roll 80 to reduce the temperature of the FFM layer 78 to ensure that it is tack free before being collected on the collection roll 80, thereby avoiding unwanted adhesion to the adjacent backside surface of the release liner. In the event that the PSA layer and FFM layer are applied as a solution or emulsion, an evaporator (not shown) or the like can be placed between the dual die station 62 and the collection roll 80 to drive off the volatile species from the faceless PSA construction before being collected on the collection roll 80 to avoid unwanted sticking to the adjacent backside surface of the release liner.

After the FFM layer has been deposited onto the underlying PSA layer, it may be desirable to further heat the FFM layer to ensure that any streaks, surface imperfections or other voids that may have been formed therein and that expose the underlaying PSA layer are removed so that the FFM layer forms an imperforate continuous film covering the PSA layer before being collected. Such further heat treating step is helpful when the FFM has a high solids content either during or after its application. A FFM applied as a hot melt, by either multi-step or tandem die process, has a solids content of approximately 100 percent. Streaks or other surface imperfections that expose the underlaying PSA layer may be formed in the FFM during its application by particulate matter in the die. Because of its high solids content, the FFM is unable to readily migrate or flow after it is applied to fill in such streaks or imperfections in the FFM layer. If left untreated, the exposed PSA layer will be allowed to make contact with a backside surface of the release liner when the faceless PSA construction is collected on the collection roll.

Contact between the PSA layer and the contiguous release layer backside surface will cause the faceless PSA construction to adhere to such backside surface, thereby making the faceless PSA construction difficult to unwind and causing the PSA layer to bond permanently to the release layer backside surface. Once the PSA layer is pulled away from its underlaying release layer and is transferred to the backside surface of the contiguous release layer the PSA faceless construction is ruined and is unsuited for lamination.

A FFM that is applied as a solution or as an emulsion, by either multi-step or tandem die process, will have a solids content of approximately 100 percent after the solvent or emulsifying agent has been evaporated away. Like the hot melt applied FFM layer, the die process that is used to apply a solvent or emulsion FFM may also create streaks or other imperfections in the FFM that exposes the underlaying PSA layer. Such streaks interfere with the nonblocking performance of the FFM layer, and thus are not desired where the prelaminate PSA construction is to be collected for further processing. In the event that the prelaminate PSA construction is subsequently printed and overlaminated after formation, the presence of such streaks are less of a concern and need not be corrected.

Streaks or imperfections in the FFM may be formed in solution or emulsion applied FFMs when either the FFM does not adequately wet the underlying PSA layer, or when the FFM becomes dewetted with the underlaying pair during further processing, e.g., during evaporation. If left untreated, the streaks or imperfections could cause a catastrophic failure of the faceless PSA construction (as discussed above) during the unwinding process by PSA layer transferal. Streaking or the formation of other imperfections that may appear in the FFM, and that expose the underlaying PSA layer, can be eliminated by heat treating the faceless PSA construction at a stage after application of the FFM layer but before the faceless PSA construction is collected on a collection roll. Heat treating the FFM layer at this point causes the FFM to soften, reflow and migrate to fill in any streaks or imperfections.

Figure 7:
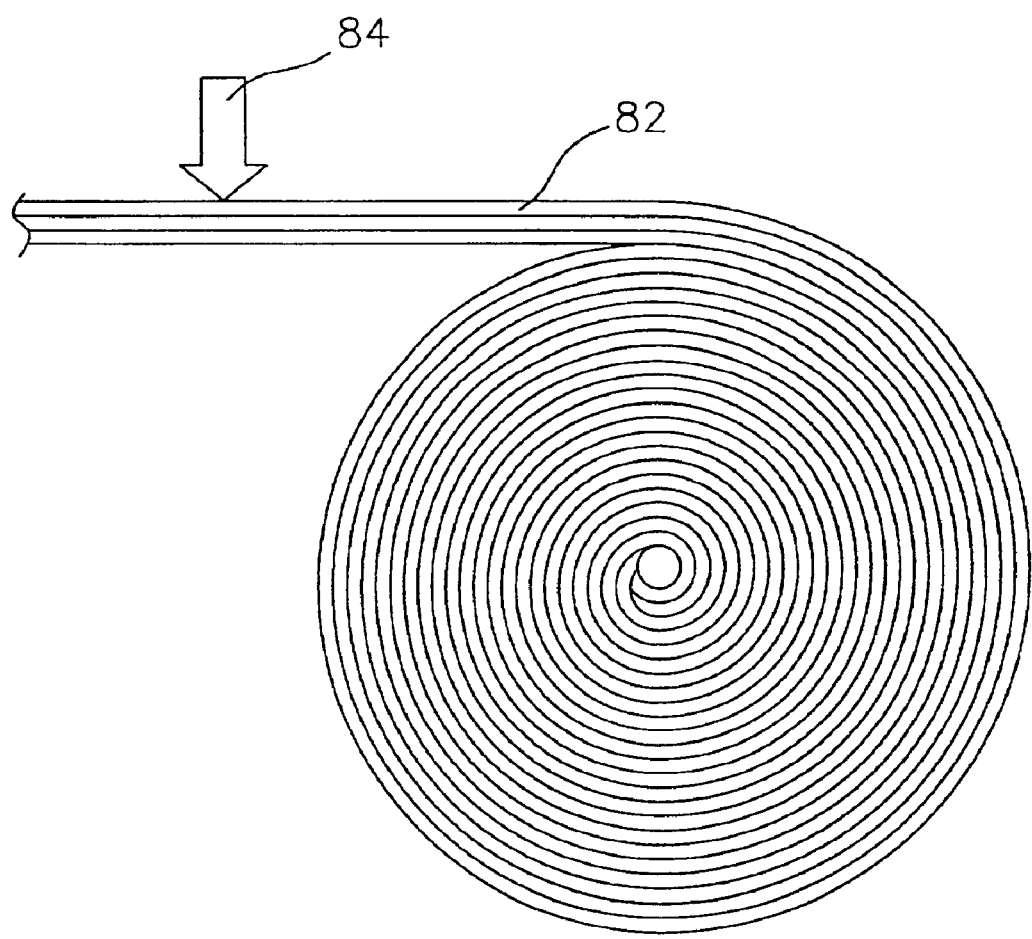
FIG. 7 is a semi-schematic side elevation of a method for heat treating a continuous film material layer of the prelaminate PSA label construction of FIG. 4.

Referring to FIG. 7, where the FFM layer 82 is applied as a hot melt and where streaking is detected, the FFM layer can be heat treated by exposure to a radiation, convection or conduction heating means as indicated generally by arrow 84 to a flow temperature that is below the FFM liquification temperature but sufficiently high to cause the FFM to reflow and fill any streaks or imperfections. In an example embodiment, the FFM layer is heated to a temperature of approximately 150° C. (300° F.) to cause it to flow a sufficient amount to fill all streaks or imperfections that expose the underlying PSA, and thereby produce a FFM layer in the form of an imperforate continuous film that completely covers the underlaying PSA layer.

Referring still to FIG. 7, where the FFM layer 82 is applied in the form of a solvent or emulsion and where streaking is detected, the FFM layer can be heat treated by exposure to radiation, convention or conduction heating as indicated by arrow 84. Heat treating the FFM layer 82 can take place independently from the evaporation operation, and can be effected by a heating means that is independent of that used for the evaporating operation. Alternatively, the step of heat treating the FFM layer 82 can be carried out as part of the evaporation operation by further heating the FFM after evaporation to a flow temperature that is below the FFM liquification temperature but sufficiently high to cause the FFM to flow and fill any streaks or imperfections. In an example embodiment, the FFM layer is heated to a temperature of approximately 150° C. (300° F.) after being evaporated to cause it to flow a sufficient amount to fill all streaks or imperfections that expose the underlying PSA, and thereby produce a FFM layer in the form of an imperforate continuous film the completely covers the underlaying PSA layer.

In an example embodiment, where streaks or other imperfections are discovered to be present in the FFM layer, the FFM is heat treated in three continuous zones using forced air convection ovens. The first zone was heated to 100° C., the second to 120° C., and the third to 140° C. Each oven was approximately 4.5 m in length. The coated laminate traveled at a speed of approximately 0.25 m/s (50 feet per minute), giving a residence time of approximately 18 s through each zone.

Samples of prelaminate PSA constructions prepared according to the conditions discussed below were tested to determine the surface roughness of the FFM layer before and after being heat treated in the manner discussed immediately above. The FFM layer of a non-heat treated faceless PSA construction had an average surface roughness of approximately 0.87 $\mu$m, and a RMS surface roughness of approximately 1.08 $\mu$m, when measured using a Wyco surface morphology microscope scanned at a magnification of approximately 5.3 times, using a scan area of approximately 1170×880 $\mu$m, and using a point-to-point distance of approximately 3.10 $\mu$m. The FFM layer of a heat treated prelaminate faceless PSA construction had an average surface roughness of approximately 0.58 $\mu$m, and a RMS surface roughness of approximately 0.71 $\mu$m under the same measurement conditions.

Based on these results, the process of heat treating the FFM layer as described herein reduced the surface roughness of the FFM layer by approximately 40 percent, thereby evidencing the filling and minimization of streaks and other imperfections in the FFM layer. Additionally, the heat-treated FFM layer also displayed a surface finish that was glossier than that of the non-heat treated faceless PSA construction.

A feature of prelaminate faceless PSA constructions for forming overlaminated PSA constructions of this invention is that they do not rely on the use of conventional facestocks for purposes of providing a substrate for accommodating printing and marking indicia. This enables the overlaminated PSA construction to be manufactured at a lower material cost, both due to the absence of a conventional facestock material, and due to reduced layer thicknesses for remaining construction materials. Another feature of using such prelaminate PSA constructions is that the chosen FFM can be a heat-activatable material that can be activated to form its own adhesive surface to facilitate subsequent lamination with an overlaminate film material without having to use separate adhesives or bonding agents.

Faceless PSA constructions of this invention also promote manufacturing efficiency by both enabling the FFM to be applied with readily available coating machinery, thereby eliminating the need for subsequent laminating machinery, and by enabling simultaneous application of the FFM and PSA, thereby avoiding the need for sequentially applying a facestock. Prelaminate PSA constructions of this invention also promote application flexibility, enabling use of the overlaminated PSA construction in applications where a high degree of flexibility/conformability is needed, e.g., where the label substrate surface has a flexible, contoured, or irregular shape.

While particular methods for manufacturing prelaminate PSA constructions have been described and illustrated, it is to be understood that conventional methods for applying PSA materials, and for making PSA constructions, can also be adapted to manufacture faceless PSA constructions of this invention.

Suitable FFMs useful for forming prelaminate faceless PSA constructions of this invention include materials that are: (1) coatable or extrudable; (2) continuous film formers; (3) capable of completely and uniformly covering the underlying PSA layer; and (4) that are, in combination with the PSA, sufficiently self-supporting to facilitate printing, overlaminating, conversion, and dispensing. A key feature of FFMs useful for forming prelaminate faceless PSA constructions is that they cure, dry or cool to both form a completely nonblocking layer and, in combination with the PSA and overlaminate film layer, are sufficiently self-supporting, having properties of tensile strength, elongation and tear. Example FFMs include thermoplastic polymers selected from the group including, but not limited polyolefins such as polypropylene, polyethylene, polyvinylchloride, polyamide resins, polyester resins, polyurethane resins, varnishes, polyacrylate resins, vinyl acetate resins, vinyl acetates such as ethylene vinyl acetate (EVA), ethylene methacrylic acid (EMAA), copolymers and mixtures thereof.

When the FFM used to form prelaminate faceless PSA constructions of this invention is applied in the form of a hot melt, solution, or emulsion by dual die method, it is desired that the FFM have a hot melt, solution, or emulsion viscosity during the coating operation that is within a viscosity window similar to that of the PSA material. This is desired to enable the FFM to form a continuous film that completely and uniformly covers the underlying PSA layer, thereby forming a nonblocking faceless PSA construction. The simultaneous delivery of the PSA and FFM is possible using conventional coating equipment and a multi-die or an extruder if the viscosities between the respective materials are relatively close and the two materials do not significantly interact with each other. When applied simultaneously using conventional die methods it is desired that the PSA and FFM have a hot melt viscosity and melting temperature, i.e., melt index, that are relatively similar. The use of polyamide resins in particular are suitable FFMs for conventional hot melt adhesives because their viscosities are similar in magnitude at the application temperatures used to deliver the respective materials.

For example, when the PSA is a conventional hot melt adhesive, the melting temperatures of the PSA are in the range of from about 150° C. to about 200° C., and preferably in the range of from about 165° C. to about 180° C. It is, therefore, desired that the FFM selected for use with such PSA have a melt temperature below about 200° C., and preferably in the range of from about 150° C. to 180° C.

Conventional hot melt PSAs have a Brookfield viscosity in the range of from about 5,000 to 90,000 cP at 175° C. A FFM having a hot melt, solution, or emulsion viscosity outside a window or range of viscosities compatible with the viscosity of the PSA material can produce a FFM layer having film defects that prevent complete and uniform layer coverage. In a preferred embodiment of the present invention, FFMs used with conventional hot melt PSAs are, for example, those having a hot melt viscosity window during coating by a dual die process that is within a factor of about 8 times the viscosity of the just-applied PSA material at a shear rate of approximately 40,000 $s^{-1}$ and at a dual die temperature of approximately 180° C.

It is desired that the FFM selected also have a chemistry that is not compatible with the underlying PSA material to prevent its migration into the PSA layer when deposited onto the PSA layer. Migration of the FFM into the PSA layer is not desired because it: (1) impairs the ability of the FFM to form a completely nonblocking layer; (2) interferes with the adhesive properties of the PSA layer; and (3) reduces the ability of the FFM layer to serve as a substrate for receiving and retaining printing and marking indicia.

It is desired that the FFM layer have a tensile strength of at least 1.4 MPa, and more preferably in the range of from 1.4 to 14 MPa. A FFM having a tensile strength less than about 1.4 MPa can produce a faceless PSA construction that is difficult to convert by die-cut and matrix-strip methods at cost effective web speeds, e.g., at web speeds greater than about 0.25 m/s. A FFM layer having a tensile strength greater than about 14 MPa can produce a faceless PSA construction that is difficult to die cut and matrix strip, depending on the particular type of PSA and FFM, and on the particular coat weights of the same.

It is desired that the FFM layer have a percent ultimate elongation of at least 50, and more preferably in the range of from about 50 to 500. A FFM having a percent ultimate elongation less than about 50 can produce an overlaminated PSA construction that is difficult to convert due to tearing and the like. A FFM layer having a percent ultimate elongation greater than about 500 can produce an overlaminated PSA construction that is difficult to convert by die-cutting and matrix-stripping, depending on the type of PSA and FFM, and on their respective coat weights.

Preferred film-forming resins useful for forming the FFM layer are thermoplastic polyamide resins. Particularly preferred polyamide resins are those commercially available, for example, from Union Camp of Wayne, N.J. under the Uni-Rez product line. Dimer-based polyamide resins available from Bostik, Emery, Fuller, Henkel (under the Versamid product line) to name a few can also be used. Other suitable polyamides include those produced by condensing dimerized vegetable acids with hexamethylenediamine. Referring to the Union Camp materials, the particular Uni-Rez polyamide resin or resin blend that is selected ultimately depends on the particular faceless PSA construction physical properties desired, and may depend on the type and viscosity of the PSA material used to form the underlying PSA layer.

In an exemplary embodiment, where the underlying PSA material is the H2187-01 hot melt rubber-based adhesive (having a Brookfield viscosity of approximately 12,000 cPs at 175° C.), a preferred FFM formed from the polyamide resin comprises a blend of Uni-Rez resins that both provides a desired viscosity within the range described above, and produces a self-supporting surface having desired properties of tensile strength, elongation and peel. For example, a 1:3 mixture of the Uni-Rez 2620 and 2623 polyamide resins produces a blend having a Goettfert viscosity curve at 155° C., at a high shear rate of approximately 40,000 seconds$^{-1}$, that differs from the viscosity curve of the H2187-01 PSA material by no greater than a factor of eight at the same temperature and same shear rate. Viscosities for the hot melt rubber-based adhesive and compatible Uni-Rez polyamide resins at different shear rates and at a temperature of approximately 180° C. are set forth in Table 1 below.

TABLE 1

| Material | Shear Rate (s$^{-1}$) | Viscosity (P) |
|---|---|---|
| H2187-01 Hot melt PSA | 10 | 97 |
|  | 100 | 90 |
|  | 1,000 | 60 |
|  | 40,000 | 18 |
| Uni-Rez 2665 | 10 | 112 |
|  | 100 | 92 |
|  | 1,000 | 85 |
|  | 40,000 | 37 |
| Uni-Rez 2620:2623 | 10 | 43 |
| (mix ratio of 1:3) |  |  |
|  | 100 | 35 |
|  | 1,000 | 35 |
|  | 40,000 | 19 |

Physical properties of FFM layers formed from the Uni-Rez product line, such as viscosity, tensile strength (ASTM D1708), percent ultimate elongation (ASTM D1708), and peel (ASTM D1876), are set forth in Table 2 below.

TABLE 2

| FFM Type (Uni-Rez product code) | Softening Point (° C.) | Brookfield Viscosity (cPs at 190° C.) | Tensile Strength (Psi) | Percent Ultimate Elongation | Peel (pli) |
|---|---|---|---|---|---|
| 2620 | 105 | 900 | 1,000 | 50 | 0 |
| 2623 | 136 | 6,500 | 1,000 | 400 | 0 |
| 2665 | 165 | 11,000 | 2,000 | 500 | 0 |
| 2695 | 128 | 5,000 | 200 | 175 | 30 |
| 2620 & 2623 (blend at 1:3) | 128 | 5,100 | 1,000 | 313 | 0 |

In alternate embodiments, faceless PSA constructions were successfully prepared by dual die-coating the H2187-01 hot melt rubber-based adhesive with film forming resins other than polyamide resins, including low density polyethylene (LDPE), such as Escorene LD509, available from Exxon Chemical Co. (Houston, Tex.); ethylene vinyl acetate, such as Escorene UL-7520, a copolymer of ethylene with 19.3% vinyl acetate, also available from Exxon Chemical Co.; and ethylene methacrylic acid, such as Nucrell 699, an ethylene copolymer containing 11% methacrylic acid, available from E. I. duPont de Nemours and Company (Wilmington, Del.).

After the FFM layer is deposited to form the faceless PSA construction, the construction can either be collected for future printing, overlaminating, and converting at a different time and/or geographic location, or can be routed to one or more other station for subsequent printing, overlaminating, and/or converting during the same operation. In an example process, the overlaminated prelaminate faceless PSA construction is collected for future printing, overlaminating, and conversion. Before printing, it is desired that the prelaminate faceless PSA construction be treated to make the surface of the FFM layer more receptive to subsequent printing or marking. In an example embodiment, the faceless PSA construction is treated by conventional surface treatment method, such as corona treatment and the like, to increase the surface energy of the FFM layer to facilitate wetting during the printing process.

Figure 8:
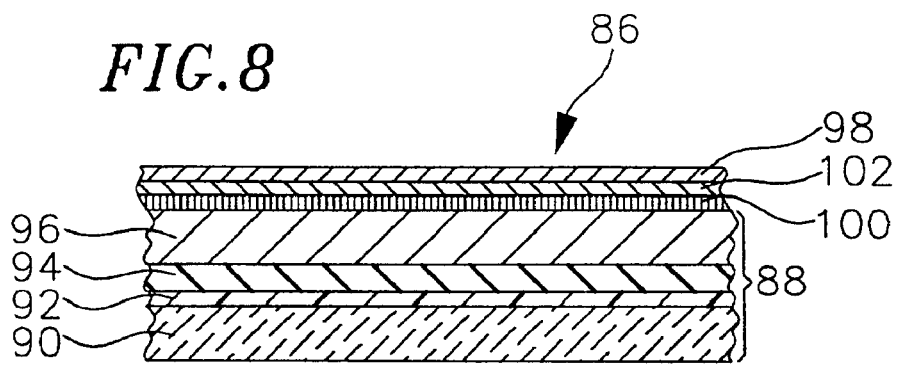
FIG. 8 is a cross-sectional side view of a first embodiment overlaminated PSA label construction prepared according to principles of the invention.
Figure 9:
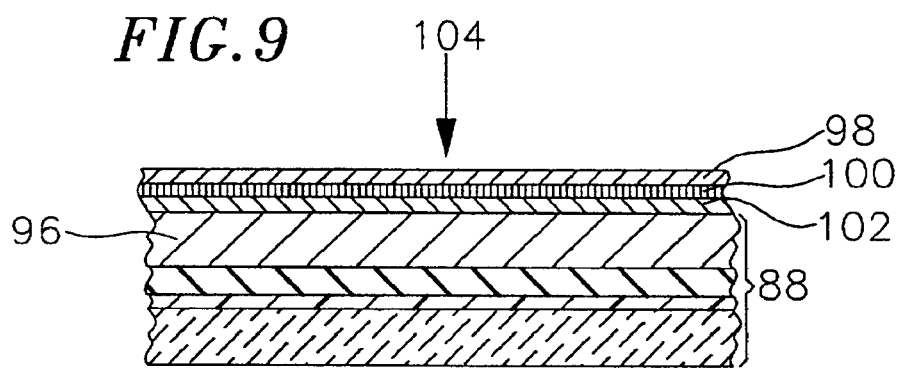
FIG. 9 is a cross-sectional side view of a second embodiment overlaminated PSA label construction prepared according to principles of the invention.

FIG. 8 illustrates a first embodiment overlaminated PSA construction 86, prepared according to principles of this invention, comprising the prelaminate PSA construction 88 as described above and illustrated in FIG. 4, comprising the flexible substrate 90, the release surface 92, the PSA layer 94, and the FFM layer 96. The PSA construction 86 comprises an overlaminate film layer 98 disposed over the FFM layer 96, printing indicia or other form of marking 100 interposed between the FFM layer 96 and overlaminate film layer 98, and a second adhesive layer 102 interposed between the FFM layer 96 and the overlaminate film layer 98 to facilitate laminating the overlaminate film layer thereto. The second adhesive layer 102 can be formed from the same types of PSA materials discussed above for the prelaminate PSA construction, and can include 2-component adhesive laminates. It is desired that the second adhesive layer thickness be in the range of from about 1 to 50 μm, and preferably in the range of from about 2 to 20 μm. FIG. 9 illustrates an example overlaminated PSA label construction comprising printed indicia 100 on the FFM layer surface 96 and the second adhesive layer 102 interposed between the overlaminate film layer 98 and the printed indicia 100 and exposed portions of the FFM layer surface 96.

It is to be understood that PSA constructions of this invention can be configured differently depending on the particular finished label application. FIG. 9, for example, illustrates an alternative overlaminated PSA construction 104 comprising the printed indicia 100 disposed along a backside surface of the overlaminate film layer 98, e.g., a reverse printed overlaminate film layer, and the second adhesive layer 102 interposed between the FFM layer surface 96, the printed indicia 100, and any exposed surface portions of the overlaminate film layer 98. As will be discussed in better detail below, the PSA construction of FIG. 9 is formed by using an overlaminate film 98 that is first reverse printed and subsequently has a layer of PSA applied to the reverse-printed surface. The overlaminated film is laminated to the prelaminate PSA construction via the PSA layer by conventional pressure lamination techniques.

Figure 10:
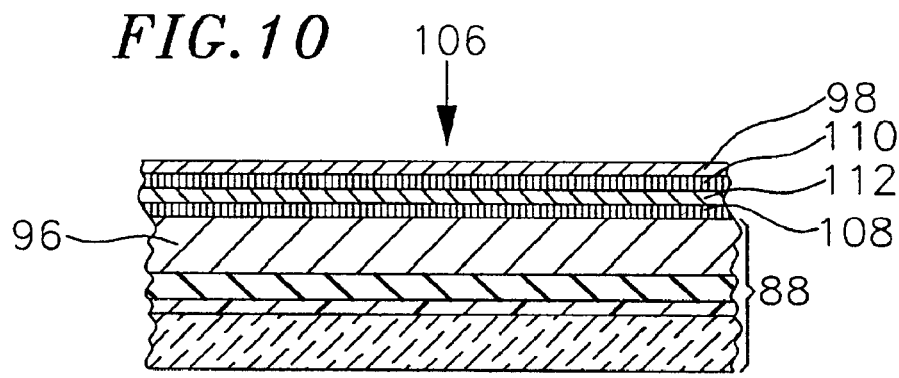
FIG. 10 is a cross-sectional side view of a third embodiment overlaminated PSA label construction prepared according to principles of the invention.

FIG. 10 illustrates another variation of a PSA construction 106 of this invention comprising a first printed indicia 108 disposed on the surface of the FFM layer surface 96, a second printed indicia 110 disposed on the backside of the overlaminate film layer 98, and the second adhesive layer 112 interposed between the first and second printed indicias 108 and 110, respectively. The PSA construction of FIG. 10 can be formed in the same manner as described above for the PSA construction of FIG. 9, except that the overlaminate film is laminated to the first printed indicia 112 and exposed FFM layer surface 96 of the prelaminate PSA construction 88.

Figure 11:
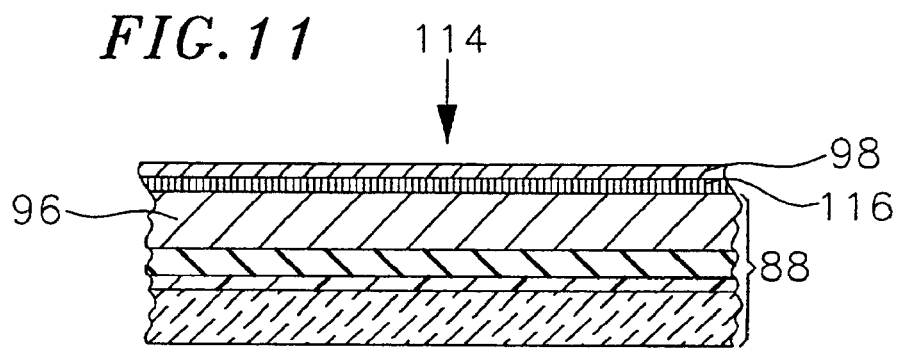
FIG. 11 is a cross-sectional side view of a fourth embodiment overlaminated PSA label construction prepared according to principles of the invention.

FIG. 11 illustrates still another variation of a PSA construction 108 of this invention comprising a printed indicia 116 interposed between the FFM layer surface 96 of the prelaminate PSA construction 88 and the overlaminate film layer 98. Unlike the PSA constructions illustrated in FIGS. 8 to 10, the PSA construction of FIG. 11 does not include a second adhesive layer for laminating the overlaminate film to the prelaminate PSA construction. Instead, either the FFM layer 96, the overlaminate film layer 98, or both are formed from a material that is activatable to provide its own adhesive surface for lamination. Suitable activatable materials include those that form an adhesive surface when exposed to heat, i.e., are heat activatable, that are described in greater detail below.

Figure 12:
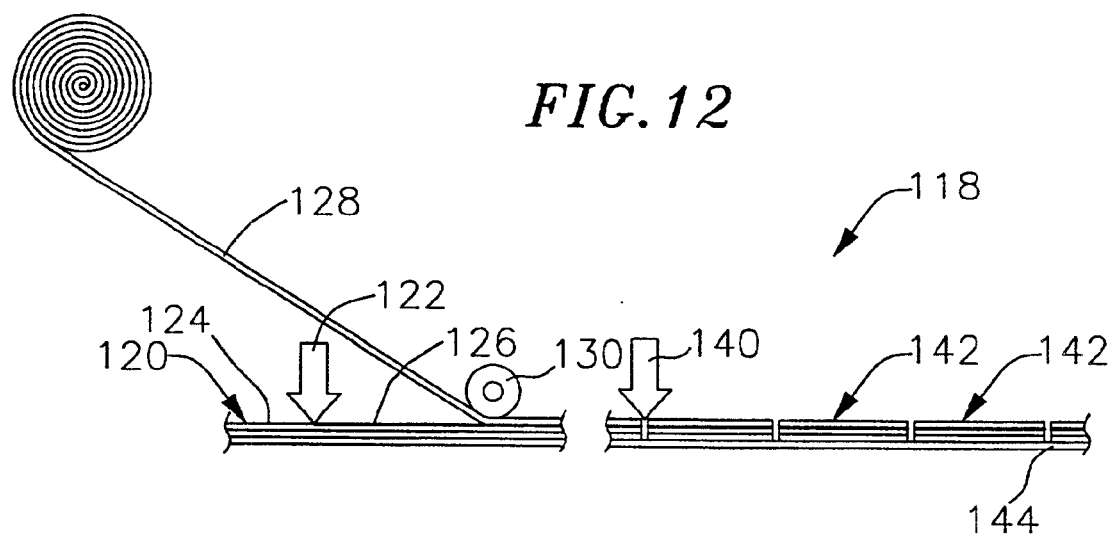
FIG. 12 is a semi-schematic side elevation of a first method of making overlaminated PSA label constructions of this invention.

FIG. 12 illustrates an example process 118 for making overlaminated PSA constructions of this invention comprising passing the prelaminate PSA construction 120 to one or more printing stations 122 where a treated FFM layer surface 124 is printed upon by conventional printing methods known in the art, such as by the gravure method, flexo method, and the like. The FFM layer surface 124 can be printed upon using conventional water-based, solvent-base, and ultra violet inks, to provide a desired printed design and/or message 126. This method can be employed to form the PSA construction illustrated in FIGS. 8, 10 and 11, i.e., the PSA construction comprising a printed indicia on the FFM layer surface.

In an example embodiment, the FFM layer surface 124 is printed upon via one or more printing station 122 by flexo method applying ultra violet ink via Anilox rolls. The total thickness of the print layer 102 is understood to vary depending on the number of printing stations, type and thickness of ink applied at each station to create a particular design or message. In an example embodiment, the total print thickness is in the range of from about 0.5 to 50 $\mu$m, and preferably in the range of from about 1 to 20 $\mu$m, applied via multiple printing stations and multiple Anilox rolls. Ultra violet ink is designed to cure to form a cross-linked structure that provides supplemental reinforcement to the underlying FFM layer, thereby aiding subsequent convertibility and dispensibility.

After the prelaminate PSA label construction 120 is printed or marked it is routed for subsequent overlaminating, where a desired overlaminating film or overlaminating film construction is applied to the printed image 126 and/or to the underlaying FFM surface 124. The overlaminating step can be performed sequentially after the printing operation or can be performed separately from the printing operation by collecting and storing the printed prelaminate faceless PSA construction as discussed above. In an example embodiment, the printed prelaminate PSA construction is overlaminated sequentially after the printing operation by applying a desired overlaminate film, overlaminate film construction, or film forming material to the underlying prelaminate PSA construction.

Desired overlaminate film materials useful for forming overlaminated PSA constructions of this invention include continuous-film materials selected from the group including, but not limited to, oriented and non-oriented transparent films formed from polyolefins such as polypropylene, polyethylene, polyamide, and other polymer materials capable of providing a protective barrier over the prelaminate PSA construction. It is desired that the film materials be optically transparent to enable viewing the underlying printed image. However, if desired the film material can be tinted or colored to suit a particular label application, e.g., to serve as a background for the printed image.

It is also desired that the overlaminate film material provide a degree of stiffness to the overlaminated PSA construction, to allow the label to be dispensed by conventional peel plate equipment, while not sacrificing the high-conformability of the prelaminate PSA construction to enable use of the overlaminated PSA construction in applications calling for flexibility and conformability. Additionally, the overlaminated film can be selected from film materials known to provide some degree of ultraviolet resistance or filtering to protect the underlying label from the adverse effects of repeated sun exposure. Further, the overlaminated film can be selected from continuous film material that also provide a security function to the label construction, such as a hologram or the like.

The PSA construction illustrated in FIG. 11 can be formed by using an overlaminate film material that is itself capable of being heat activated to form its own adhesive surface, and having a sufficient "open tack" time, to facilitate laminating to the underlying prelaminate PSA construction at relatively low temperature, so as to avoid unwanted heat effects on the prelaminate PSA construction. "Open tack" refers to the amount of time that a just-activated overlaminate film material remains tacky or open to adhesive contact with an adjacent surface. Certain polymer films, when heated to their melting temperature and cooled, require an amount of time to fully harden. During such time the polymer can remain tacky. This period after cooling where the polymer remains tacky permits ambient or subactivation temperature lamination of a second substrate to the tacky surface, which is highly desirable. Suitable heat-activatable overlaminate film materials include heat seal materials such as thermoplastic polyamide resins. Particularly preferred polyamide resins include those described above for forming the FFM layer. Other suitable polyamides include those produced by condensing dimerized vegetable acids with hexamethylenediamine.

The overlaminated PSA construction illustrated in FIG. 11 is prepared by the example process of FIG. 12 by heating a heat-activatable overlaminate film material 128 to a determined activation temperature by exposing one surface of the overlaminate film material to a heat source (not shown) and passing the activated overlaminate film material 128 through a roller 130 for lamination with the underlying printed surface 126. It is desired that the lamination temperature at the nip be below the activation temperature to minimize any adverse heat effects on the underlying printed surface and prelaminate faceless PSA construction.

Alternatively, the PSA construction of FIG. 11 can be formed having the FFM layer instead of the overlaminate film formed from a heat-activatable material. Such construction is prepared according to the process of FIG. 12 by heat activating the FFM layer surface 124 by suitable heating means after it is printed upon under closely-monitored conditions to ensure that the print image is not adversely affected. Once activated, the FFM layer 124 comprises an adhesive surface having a desired open tack time, i.e., it has an adhesive surface for a controllable window of time, to accommodate subsequent lamination with the overlaminate film material 128 using conventional lamination methods. In an effort to minimize or eliminate the possibility of print image distortion when heat-activating the FFM layer, a reverse-printed overlaminate film can be used for laminating to the heat-activated FFM layer 124. Both such lamination methods, involving the step of heat-activating the overlaminate film material or the FFM material, produce an overlaminated PSA construction that does not require a PSA layer interposed between the FFM layer and the overlaminate film layer.

In an example embodiment, where a heat-activatable FFM or overlaminate film is used, it is desired that the heat-activatable material have an open tack time greater than about 0.25 s and less than about 20 s, and preferably less than about 5 s after activation. To reduce the open tack time during the process of laminating the prelaminate PSA construction, and thereby speed up the rate at which the construction is laminated, the activated material may be cooled before lamination by use of a conventional cooling means placed between the activation means and the lamination means. Cooling the activated material allows lamination to occur at ambient or subactivation process temperature conditions shortly after heat activation, thereby minimizing potential heat damage to the prelaminate PSA construction.

Materials useful for forming a heat-activatable FFM layer or overlaminate film include those heat-seal adhesives previously described, modified heat-seal adhesives, and delayed-action heat-seal adhesives. Preferred modified heat-seal adhesives include those heat-seal adhesive previously described that additionally include one or more plasticizers and/or tackifiers to make them behave more like PSAs during their open tack time period. An exemplary modified heat-seal adhesive is a polyamide resin formed by condensing equal molar amounts of Hystrene 3695 dimer acid available from Humco of Texarkana, Tex. with hexamethylenediamine, taking 50 percent by weight of such polyamide resin and adding to it about 25 percent by weight castor bean oil, and 25 percent by weight Foral 85 rosin ester tackifier from Hercules Inc., of Wilmington, Del.

Delayed-action heat-seal adhesives useful for forming a heat-activatable FFM layer or overlaminate film include polymers that normally do not possess open tack, but are mixed with one or more solid plasticizer. When melted, the solid plasticizer causes the nontacky polymer to become tacky, and remains liquid for some time after cooling to provide an open tack. Suitable delayed-action heat-seal adhesives are commercially available from, for example, Kimberly-Clark, Brown Bridge Industries of Troy, Ohio under the product names 402-MC, 64-BAK, 441-BL and 70-RECA; Oliver Products Company of Grand Rapids, Mich. under its Engineered Adhesive Coated Products line; and Nashua Graphic Products of Merrimack, N.H. under the product names RX-1, BM-4, PBL-3, as described in U.S. Pat. Nos. 2,462,029, 3,104,979, and 2,678,284, which are each herein incorporated by reference.

Overlaminated PSA constructions illustrated in FIGS. 8 to 10 can be prepared according to the example process of FIG. 12 by using an overlaminated film construction comprising the second PSA layer disposed along a backside surface, i.e., a surface arranged to be laminated with an adjacent prelaminate PSA construction surface. The second PSA layer can be applied to the overlaminate film backside surface by the same techniques previously described for applying the PSA layer to form the prelaminate PSA construction. In a preferred embodiment, the second PSA layer is applied in the form of an emulsion spray.

The overlaminate film construction 128 can additionally include a release liner (not shown) disposed on the PSA layer to facilitate collecting and storing the overlaminate construction in roll form after it is formed. During the laminating process, the release liner is removed from the overlaminate film construction, e.g., after the film construction is payed out from a collection roll, to expose its underlying PSA layer. The overlaminate film construction is run through roller 130, causing the overlaminate film construction PSA layer to be pressure laminated to the underlying prelaminate PSA construction surface. Alternatively, the overlaminate film 94 can be coated with a PSA layer 98 and routed for subsequent lamination with the prelaminate PSA construction 86 during the same operation without being collected, thus without the need for a release liner. In either case, the printed indicia for the completed PSA construction can be on the FFM layer surface (as shown in FIG. 8), can be reverse printed on a backside surface of the overlaminate film (as shown in FIG. 9), or can be on both the FFM layer surface and reverse printed on the overlaminate film (as shown in FIG. 10) depending on the particular label application.

Figure 13:
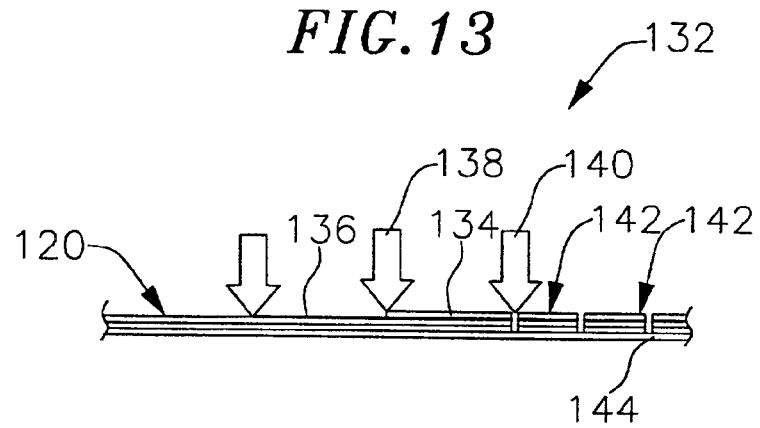
FIG. 13 is a semi-schematic side elevation of a second method of making overlaminated PSA label constructions of this invention.

FIG. 13 illustrates another example process 132 for forming an overlaminated PSA construction of this invention illustrated in FIG. 11, using the above-described prelaminate PSA construction. In such process the overlaminated PSA construction is formed by applying an overlaminate film-forming material 134 to the underlying printed surface 136 of the prelaminate PSA construction 120. The overlaminate film-forming material 134 can be applied by the same coating methods described above for applying the FFM to form the prelaminate faceless PSA construction, by routing the printed prelaminate PSA construction through a spray or coating station 138. The film-forming material can be selected from the group of materials that are capable of being dispensed in liquid form, e.g., as a hot melt, an emulsion or aqueous dispersion, as a solvent solution, to subsequently form a continuous overlaminate film under proper conditions. Example film-forming materials include varnishes and those materials, e.g., polyamides, described above used to form the FFM of the prelaminate faceless PSA construction. Additionally, the film-forming materials can be selected to provide a degree of ultraviolet protection to the label construction if desired.

It is desired that the thickness of the overlaminate film material be sufficient to: (1) protect the underlying printed image and PSA label construction from damage caused by physical contact with adjacent objects, and from damage caused by moisture; (2) provide a sufficient degree of rigidity and stiffness to the overlaminated PSA construction to facilitate high-speed conversion and dispensing by conventional peel plate equipment; and (3) provide a desired degree of conformability to the label construction to enable use with a variety of different substrates. In an example embodiment, the overlaminate film can have a coating thickness of in the range of from about 1 to 125 $\mu$m, and preferably has a coating thickness in the range of from about 5 to 50 $\mu$m. It is to be understood that the particular overlaminate film coating thickness will vary depending on a number of factors, such as the coating thickness of the different layers used to form the prelaminate PSA construction, the types of materials selected to form the prelaminate PSA construction, the thickness of the printed indicia and type of material used to form the same, and the particular convertibility, dispensability and conformability criteria for the overlaminated PSA construction.

An overlaminate film coating thickness that is less than about 1 micrometer can form an overlaminated PSA construction that may possess one or more of the following characteristics: (1) it may lack sufficient stiffness to facilitate high-speed convertibility and/or dispensibility by conventional peel plate equipment; (2) it may not adequately protect the underlying printed indicia from physical contact with adjacent objects or moisture; and (3) it may not enhance the underlying printed indicia a desired amount. An overlaminate film coating thickness that is greater than about 125 $\mu$m can form an overlaminated PSA construction that: (1) is too stiff or rigid, thus lacking a desired degree of flexibility or conformity that could cause the label to lift away from an applied substrate surface; and/or (2) may blur or adversely affect the ability to clearly view the underlying printed indicia.

PSA label constructions of this invention have a total construction thickness (not including the release liner) of in the range of from about 9 to 150 µm, and preferably in the range of from about 50 to 120 µm. Overlaminated PSA constructions having a construction thickness of less than about 9 µm can lack sufficient stiffness to enable both high-speed convertibility and dispensing using peel plate equipment, while overlaminated PSA constructions having a construction thickness of greater than about 150 µm can lack sufficient conformability to permit their use on certain applications.

Referring back to FIGS. 12 and 13, after application of the overlaminate film layer, overlaminate film construction, or overlaminate film-forming material, the overlaminated PSA construction can either be collected for conversion at a later time and/or at a different location, or can be routed to one or more converting station 140 after the printing and laminating operation. In an example embodiment, the overlaminated PSA construction is routed to a converting station 140 after lamination where it is cut and stripped by conventional converting methods, e.g., by die-cutting and matrix-stripping methods, to form a PSA label having a desired shape and size. FIGS. 12 and 13 illustrate die-cutting and matrix-stripping the overlaminate film layer, the printed indicia and underlying FFM layer, and the PSA layer of the overlaminated PSA construction at station 140 into a series of PSA labels 142 of desired shape and size, carried by the release liner 144.

A key feature of overlaminated PSA label constructions of this invention is that they are highly conformable yet sufficiently stiff to permit both high-speed converting and dispensing using conventional peel plate equipment. Overlaminated PSA constructions of this invention have a Gurley stiffness in the machine direction of less than about 40 mg. For applications calling for a high degree of conformability, overlminated PSA constructions can be designed having Gurley stiffness of less than about 20 mg, and preferably less than 10 mg, and in some instances in the range of from about 3 to 8 mg (as measured per TAPPI Gurley stiffness test T-543). It is a surprising and unexpected result to find that overlaminated PSA constructions having such a low Gurley stiffness can be both converted at high speeds and dispensed using conventional peel plate equipment. Conventional wisdom has been that only those PSA labels having a Gurley stiffness of at least 10 mg, and in most cases at least 20 mg, were capable of being converted at high speeds and being dispensed using conventional peel plate equipment. The overlaminated PSA construction of the present invention provides a surprising level of PSA label conformability without sacrificing high-speed converting and dispensing using conventional peel plate equipment.

Overlaminated PSA label constructions of this invention can be converted by conventional die-cutting and matrix-stripping methods at web speeds that meet or exceed PSA label constructions having conventional facestocks, e.g., paper, and that have Gurley a stiffness greater than 20 mg. In an example embodiment, overlaminated PSA constructions of this invention are die cut and matrix stripped at a web speed of approximately 0.75 m/s, and can be die cut and matrix stripped at web speeds up to approximately 1.5 m/s depending on a number of factors, such as the type of FFM and overlaminate film material used, the coat weight of the FFM and overlaminate film material, and the thickness and type of ink used to form the printing indicia. Generally speaking, overlaminated PSA constructions comprising higher coat weights of the FFM layer and/or overlaminate film material permit conversion at greater speeds than those comprising lower coat weights of the FFM layer and/or overlaminate film material.

Overlaminated PSA label constructions of this invention are sufficiently stiff to allow dispensing using a peel plate or back-peel edge at high speeds, e.g., in excess of 200 pieces per minute and up to about 250 pieces per minute which correspond to a speed of about 0.4 to 0.5 m/s. Preferably, dispensing can occur at a rate of at least 500 pieces per minute, and more preferably at 550 pieces per minute or higher.

An example illustrative of prelaminate and overlaminated PSA label constructions of this invention is as follows:

EXAMPLE

Prelaminate Faceless PSA Construction

A prelaminate faceless PSA construction was prepared by hot melt dual-die method by applying a PSA layer comprising H2187-01 adhesive to a 42 pound basis weight per ream Rhi-Liner 12 release liner comprising a layer of General Electric 6000 silicone releasable material. A FFM comprising a Uni-Rez 2665 polyamide resin (having a hot melt viscosity within a factor of approximately eight times that of the PSA) was simultaneously applied to a surface of the PSA layer. The coat weight of the PSA was about 20 g/m$^2$, or about 20 µm thick. Five grams of Leucopure EGM UV chromophore was added to about 19 L of the polyamide resin at a blend ratio of 0.26 gram Leucopure per liter resin to permit visual observation of the FFM layer under a UV light. The polyamide resin was applied at a coat weight of about 25 g/m$^2$, or about 25 µm thick. The total thickness of the prelaminate PSA construction, excluding the release liner, was approximately 45 µm.

EXAMPLE

Overlaminated PSA Constructions

The prelaminate PSA construction prepare in the above example was printed upon by the flexo method using three printing stations and three Anilox rolls. An ultraviolet ink was used and the total ink coating thickness was approximately 10 µm. Three different overlaminated PSA constructions were prepared, each having the general construction as illustrated in FIG. 8, by laminating to the prelaminate three different types of overlaminate film. A first overlaminated PSA construction was prepared by pressure laminating to the prelaminate construction an overlaminate film construction comprising an optically-transparent overlaminate film, formed from polypropylene and having a film thickness of approximately 20 µm, and an adhesive layer having a thickness of approximately 4 µm, disposed alongside a backside surface of the overlaminate film. The adhesive layer is for example, a two component, solvent-based or water-based adhesive commonly used for lamination in the flexible packaging industry (e.g., an adhesive used to laminate bags of chips, coffee bags, etc.). ADCOTE® adhesives, available from Morton International (Chicago, Ill.), are one example of flexible packaging industry adhesives.

A second overlaminated PSA construction was prepared by pressure laminating to the prelaminate construction an overlaminate film construction comprising an optically-transparent overlaminate film, formed from biaxially-oriented polypropylene and having a film thickness of approximately 25 µm, and a PSA layer in the form of a two-component laminate adhesive having a layer thickness of approximately 20 µm millimeters, disposed along a backside surface of the overlaminate film.

A third overlaminated PSA construction was prepared by pressure laminating to the prelaminate construction an overlaminate film construction comprising an optically-transparent overlaminate film, formed from polypropylene and having a film thickness of approximately 30 µm, and a PSA layer, formed from the same PSA described above for the first construction and having a layer thickness of approximately 4 µm, disposed along a backside surface of the overlaminate film. Each of the first, second, and third examples of overlaminated PSA constructions had a total construction thickness (excluding the release liner) of approximately 79 µm, 100 µm, and 89 µm, respectively.

Each of the three overlaminated PSA constructions were converted by die-cutting and matrix-stripping at a web speed of approximately 160 feet per minute. Each of the overlaminated PSA labels were dispensed using a Dispensa-Matic Model U-45 peel plate dispenser, and were tested for Gurley stiffness. The first, second and third example overlaminated PSA construction had a Gurley stiffness of approximately 4.2, 6 and 7.8 mg, respectively. The release value for the second example overlaminated PSA construction was also tested (using ASTM D-5375-93, with a TLMI Lab Master as the test apparatus, a 50×254 mm sample is peeled by stripping the carrier from the facestock at an angle of approximately 90° and at a peel rate of approximately 0.3, 7.6 and 30.5 m/min) and found to have a release value of 18, 53 and 63 grams/51 mm width at 0.3, 7.6 and 30.5 m/min) respectively. Release values for conventional PSA constructions are known to be greater than about 80 grams/51 mm width. It is theorized that the relatively low release force found in overlaminated PSA constructions of this invention contribute to the dispensibility of the overlaminated PSA label, allowing the relatively low stiffness construction to be dispensed at high speeds using peel plate equipment.

One feature of the overlaminated PSA constructions, prepared according to principles of this invention, is that the overlaminate film layer serves to protect the underlying printed indicia and label construction from damage that can be caused by physical contact with an adjacent object. For example, when used as a label on a glass or plastic beverage container, the overlaminated film layer protects the printed indicia from being scraped or otherwise damaged by contact with adjacent bottles when packaged, stored or displayed for sale or use. Additionally, the overlaminate film layer protects the underlying printed image from damage caused by moisture or water contact, e.g., in situations where the label is used on beverage containers that are stored in ice bath before consumption.

Another feature of the overlaminated PSA constructions, prepared according to principles of this invention, is that they are flexible and conform to a variety of different substrate surface configurations, e.g, a curved surface such as that found on a beverage container or bottle, without lifting or other adverse consequence. The improved conformability of the overlaminated PSA construction, when compared to conventional PSA construction, is due to the design of combining a highly-conformable, thin-film faceless prelaminate PSA construction with a suitable overlaminate film material that provides sufficient stiffness to enable high-speed conversion and dispensibility without sacrificing conformability.

Overlaminated PSA constructions of this invention are also useful, for example, as labels on glass beverage bottles and, more specifically, as pre-applied labels that are adhered to such glass bottles prior to washing/rinsing, filling and pasteurization processes. Pre-applied labels formed from PSA constructions of this invention are capable of withstanding bottle washing/rinsing, filling and pasteurization processes without lifting away from the bottle surface, without hazing or otherwise adversely affecting the optical quality of the printed image, and without displaying any other adverse consequences. The ability for PSA constructions of this invention to function as a pre-applied label without adverse consequences is surprising and unexpected given the known deficiencies of conventional PSA label constructions when placed in the same pre-applied label application.

Conventional PSA constructions, when subjected to pasteurization process, are known to peel away from the underlying substrate surface, making them unsuited for such application. Such lifting is thought due to the relatively high stiffness or rigidity of the facestock that pulls the PSA layer away from the substrate surface when the PSA warms during the pasteurization process. Overlaminated PSA constructions of this invention are particularly well suited for use in applications such as pre-applied bottle labels because of their relatively low stiffness and related enhanced conformability and PSA wetability that prevents such label lifting.

The first and third example overlaminated PSA constructions of this invention, prepared according to Example No. 1 described above, were formed into labels and pre-applied to 590 mL glass beverage bottles. The labeled bottles were subjected to pasteurization conditions by placing the labeled bottles in a circulating heated water bath maintained at approximately 73° C. for a period of approximately 15 min, after which time the bottles were removed from the water bath for inspection. The labels were inspected for lifting and optical clarity, and displayed no signs of lifting or haziness both immediately after being removed from the bath, and after being removed for one entire day. Pre-applied PSA bottle labels from first and third example overlaminated PSA constructions were also subjected to water spray pasteurization testing, where hot water at a temperature of approximately 65° C. was sprayed onto the label for a period of approximately 2 hrs. The labels showed no signs of lifting or hazing under these testing conditions.

Further, the overlaminated film material can be selected to protect the underlying printed indicia from the effects of weather and sun exposure. For example, in applications where the PSA label construction is applied to a substrate that is exposed to the sun for extended periods of time the overlaminate film material can be selected from a material that provides a degree of ultraviolet resistance and/or that filters some of the ultraviolet rays from the underlying printing indicia to minimize fading. Another advantage of overlaminated faceless PSA constructions prepared according to principles of this invention is that the overlaminate film layer is preferably selected and used at a desired thickness to optically enhance the underlying printed indicia, e.g., making the printed indicia appear to be glossier, with a brighter hue and more brilliant color intensity.

Although limited embodiments of overlaminated PSA constructions and methods for making the same according to principles this invention have been described herein, many modifications and variations will be apparent to those skilled in the art. Accordingly, it is to be understood that, within the scope of the appended claims, overlaminated PSA constructions of this invention may be prepared other than as specifically described herein.

What is claimed is:

1. A method for forming a pressure-sensitive adhesive construction comprising the steps of:

applying a layer of pressure-sensitive adhesive to a release surface of a removable substrate;

simultaneously applying a film-forming material onto a surface of the pressure-sensitive adhesive layer to form a continuous film thereover and render the pressure-sensitive adhesive tack free, wherein the film-forming material has a viscosity that is within a range of viscosities that is compatible with the viscosity of the pressure-sensitive adhesive at a shear rate of approximately 40,000 s$^{-1}$ and at a given application temperature;

laminating an overlaminate film layer onto the continuous film; and forming a printed indicia onto one of the continuous film or a backside surface of the overlaminate film layer adjacent the continuous film.

2. The method as recited in claim 1 further comprising the stop of heating one of the continuous film or the overlaminate film layer before the step of laminating to provide an adhesive surface for subsequent lamination with the other of the continuous film or the overlaminate film layer.

3. The method as recited in claim 1, wherein the continuous film is formed from a material having a viscosity within eight times 40,000 s$^{-1}$ and at a given application temperature.

4. The method as recited is claim 3, wherein the given application temperature is from about 150° to about 180° C.

5. A method for forming a pressure-sensitive adhesive construction comprising the steps of:

applying a pressure-sensitive adhesive material to a release surface of a removable substrate;

applying a film-forming material onto a surface of the pressure-sensitive adhesive material, while the pressure-sensitive adhesive material is in a non-final state, to form a continuous film thereover and render the pressure-sensitive adhesive tack free;

laminating an overlaminate film layer onto the continuous film;

forming a printed indicia onto one of the continuous film or a backside surface of the overlaminate film layer adjacent the continuous film;

wherein the steps of applying the pressure-sensitive adhesive material and applying the film-forming material are done simultaneously in a single step; and wherein the film-forming material has a viscosity that is within a range of viscosities that is compatible with the viscosity of the pressure-sensitive adhesive material at a shear rate of approximately 40,000 s$^{-1}$ and at a given application temperature.

6. A continuous method for forming an overlaminated pressure-sensitive adhesive construction comprising the steps of:

forming a prelaminate pressure-sensitive adhesive construction comprising:

applying a layer of pressure-sensitive adhesive material to a release surface of a removable substrate;

applying a film-forming material onto a surface of the pressure-sensitive adhesive material to form a continuous film thereover and render the pressure-sensitive adhesive material tack free;

forming a printed indicia onto a surface of the prelaminate pressure-sensitive construction; and applying an overlaminate film layer onto the surface of the printed indicia; and wherein the pressure-sensitive adhesive material and the film-forming material are applied simultaneously in a single step.

* * * * *